(12) United States Patent
Sugden et al.

(10) Patent No.: US 7,478,689 B1
(45) Date of Patent: Jan. 20, 2009

(54) VEHICLE STEERING AND SPEED CONTROL

(75) Inventors: David J. Sugden, Horicon, WI (US);
James W. Hall, Princeton, WI (US)

(73) Assignee: Scag Power Equipment, Inc., Mayville, WI (US)

( * ) Notice: Subject to any disclaimer, the term of this patent is extended or adjusted under 35 U.S.C. 154(b) by 0 days.

(21) Appl. No.: 11/689,341

(22) Filed: Mar. 21, 2007

Related U.S. Application Data

(60) Provisional application No. 60/743,610, filed on Mar. 21, 2006.

(51) Int. Cl.
*B62D 51/04* (2006.01)
(52) U.S. Cl. .................................................. 180/19.3
(58) Field of Classification Search ............... 180/19.3, 180/19.1, 19.2, 6.2, 6.48, 315, 65.8, 307; 56/10.8, 11.3, 15.8, 11.6
See application file for complete search history.

(56) References Cited

U.S. PATENT DOCUMENTS

| | | | |
|---|---|---|---|
| 1,428,231 A | 9/1922 | Hicks | |
| 2,457,821 A | 1/1949 | Johnson | |
| 2,766,834 A | 10/1956 | Boyer | |
| 3,029,887 A | 4/1962 | Schantz | |
| 3,196,971 A | 7/1965 | Schantz | |
| 3,382,653 A | 5/1968 | Buigne | |
| 3,465,841 A | 9/1969 | Pulskamp et al. | |
| 4,558,558 A * | 12/1985 | Horner et al. ............... | 56/11.3 |
| 4,716,980 A | 1/1988 | Butler | |
| 4,930,369 A | 6/1990 | Barnard et al. | |
| 5,146,735 A * | 9/1992 | McDonner ................... | 56/11.3 |
| 5,155,985 A * | 10/1992 | Oshima et al. ............... | 56/10.8 |
| 5,297,379 A | 3/1994 | Smith | |
| 5,355,661 A | 10/1994 | Tomiyama | |
| 5,644,903 A | 7/1997 | Davis, Jr. | |
| 5,667,032 A | 9/1997 | Kamlukin | |
| 5,913,802 A * | 6/1999 | Mullet et al. ................ | 56/10.8 |
| 5,984,031 A | 11/1999 | Velke et al. | |
| 6,082,083 A * | 7/2000 | Stalpes et al. .............. | 56/11.6 |
| 6,434,917 B1 | 8/2002 | Bartel | |
| 6,460,640 B1 | 10/2002 | Keagle et al. | |
| 6,595,306 B2 | 7/2003 | Trego et al. | |
| 6,640,526 B2 | 11/2003 | Velke et al. | |
| 6,658,831 B2 | 12/2003 | Velke et al. | |
| 6,769,392 B2 | 8/2004 | Lawrence et al. | |
| 6,769,501 B2 | 8/2004 | Iida et al. | |
| 6,848,523 B2 | 2/2005 | Ishikawa et al. | |
| 6,874,308 B1 | 4/2005 | Bartel | |
| 6,883,625 B2 | 4/2005 | Trego et al. | |
| 6,935,092 B2 | 8/2005 | Velke et al. | |
| 2003/0029647 A1* | 2/2003 | Trego et al. ................ | 180/19.1 |
| 2004/0031629 A1* | 2/2004 | Walker ....................... | 180/6.48 |
| 2004/0099453 A1 | 5/2004 | Guy | |
| 2004/0211615 A1* | 10/2004 | Oxley ......................... | 180/307 |

(Continued)

*Primary Examiner*—Árpád Fábián-Kovács
(74) *Attorney, Agent, or Firm*—Boyle Fredrickson S.C.

(57) ABSTRACT

A control system for a lawnmower includes a handlebar connected to the lawmnower for controlling direction and speed of travel of the lawmower based on a position of the handlebar relative to the lawnmower. The control system is connected to a drive system of the lawnmower such that changing the elevation of the handlebar adjusts operation of a number of wheel drive units and turning of the handlebar relative to the lawnmower adjusts operation of one wheel drive unit relative to another wheel drive unit.

25 Claims, 13 Drawing Sheets

U.S. PATENT DOCUMENTS

2005/0011696 A1 * 1/2005 Bares et al. ............ 180/315
2005/0126146 A1 * 6/2005 Velke et al. ............ 56/16.7
2005/0183409 A1 * 8/2005 Barrier ............ 56/11.9

* cited by examiner

VEHICLE STEERING AND SPEED CONTROL

CROSS-REFERENCE TO RELATED APPLICATIONS

This application claims priority to Provisional Application Ser. No. 60/743,610 filed on Mar. 21, 2006, titled "Steering System For A Lawnmower" and the disclosure of which is incorporated herein.

BACKGROUND OF THE INVENTION

1. Field of the Invention

The invention relates to a steering system and, more particularly, relates to a steering system for a self-propelled lawnmower.

2. Discussion of the Related Art

Lawnmowers equipped with dual hydraulically-powered drive systems that propel the drive wheels on each side of the mower are known in the grooming a lawns. Turning is achieved by driving each drive wheel at different speeds. They can even be turned in different directions for a very sharp or even a "zero-turn" radius, where the mower pivots about the midpoint drive wheel axis. This kind of drive wheel steering system is more maneuverable than traditional vehicle steering systems that employ one set of wheels, either front or rear, which turned in unison while other drive wheels are powered to drive the mower in a forward or rearward direction.

Hydraulically-powered drive systems typically include a separate variable displacement hydraulic pump for each of the drive wheels. Each variable displacement pump is typically an axial-piston type which includes a tilting swash plate which can vary the pump discharge rate from a zero flow, also referred to as neutral, up to a maximum flow or reverse direction flow to a particular maximum.

The pumps are controlled by an operator controlled steering mechanism. Several such mechanisms are known, all of which have disadvantages.

For example, U.S. Pat. No. 5,822,961, entitled "Quick Adjustment for Straight Ahead Travel for a Wheel-Steered Lawn Mower," discloses a pistol-grip type of steering mechanism for adjusting a dual-hydraulically-powered walk-behind mower. Right and left steering control levers can be squeezed to control steering of the walk-behind mower.

A drawback of this type of steering control mechanism is that it requires squeezing with the operator's fingers to maneuver the mower. Repeated squeezing motions causes fatigue and increases the likelihood of carpal tunnel syndrome. Vibrations are also transmitted to the operator's hands.

Another drawback is that this type of steering control is not adjustable for variable sizes of hands. The physics of operating larger machinery requires larger steering linkages, which are more difficult to operate with smaller hands. This further increases fatigue and the likelihood of carpal tunnel syndrome.

U.S. Pat. No. 5,913,802, entitled "Single Lever Drive Wheel Steering Power Lawn Mower," discloses a self-propelled mower equipped with a pair of variable flow hydraulic pumps controlled by a T-shaped steering handle. The T-shaped steering handle is configured to rotate about a vertical axis so as to transmit control forces to the variable displacement pumps so as to control the steering of the lawn mower. The handlebar can also be rotated or twisted about a horizontal axis to control the speed of the mower from a stationary neutral position or a reverse direction position.

This steering control mechanism has similar drawbacks to that described above for the pistol-type grip lever. Repeated twisting motions with the wrists to control steering of the mower causes fatigue and increases the likelihood of carpal tunnel syndrome. Another drawback is the difficulty encountered in simultaneously twisting the grip and rotating a grip handle to maneuver a turn of the mower.

In addition, speed limiters for traditional lawnmowers must be operated independently of the steering system, complicating operation and making the lawnmower more difficult to control during a turn.

SUMMARY OF THE INVENTION

In light of the foregoing, a steering assembly is desired that improves the state of the art by overcoming the aforesaid problems of the prior art.

It is also desired to provide a steering system that reduces or dampens the transfer of vibration from the engine to the steering handle of the mower.

It is also desired to provide a steering system that reduces the forces required to operate the mower, thereby further reducing the transfer of vibration to the operator's grip.

It is also desired to provide a mower having a steering system with a steering handle operatively connected to the first and second drives, where rotational movement of the steering handle from a central longitudinal position steers the mower to turn in the direction from a forward direction of travel, and where movement of the steering handle in a vertical direction controls forward propulsion of the mower.

It is also desired to provide a steering system for a mower having a speed limiter assembly that includes speed limiter reference bar variably positioned relative to the steering handle, where engagement of the steering handle along the speed limiter reference bar automatically slows a speed of the mower maneuvering a turn relative to a speed of the mower in the forward direction.

It is also desired to provide a speed limiter assembly having a speed limiter reference device that is variably positioned to adjust a maximum speed of the mower.

It is also desired to provide a method of operating a mower that includes at least some of the steps in accordance with the foregoing summary.

In accordance with an aspect of the invention, at least some of these desires are fulfilled by providing a steering assembly for a zero turn lawnmower or other vehicle that is handlebar or yoke based rather than squeeze grip based. A handle is coupled to the swash plate actuators of left and right pumps by linkages that result in forward, rearward, and/or turning motion of the lawnmower depending on the direction and magnitude of handle movement. For instance, pivoting of the handle about a horizontal axis upwardly or downwardly from a neutral position may result in reverse or forward propulsion of the lawnmower at speed proportional to the magnitude of pivoting. Pivoting of the handle about a vertical axis may result in turning of the lawnmower to the left or the right. The handle or another type of steering device may cooperate with an adjustable speed limiter that can be actuated to set a maximum speed of the lawnmower. The speed limiter may be configured to cause the lawnmower to automatically decelerate through a turn. The handle and speed limiter may be provided either singly or in combination and may apply to either riding or walk behind lawnmowers and even to other hydraulically powered self propelled machines.

BRIEF DESCRIPTION OF THE DRAWINGS

The drawings illustrate a preferred and exemplary embodiment of the invention.

In the drawings.

DETAILED DESCRIPTION OF THE PREFERRED EMBODIMENTS

Figure 1:
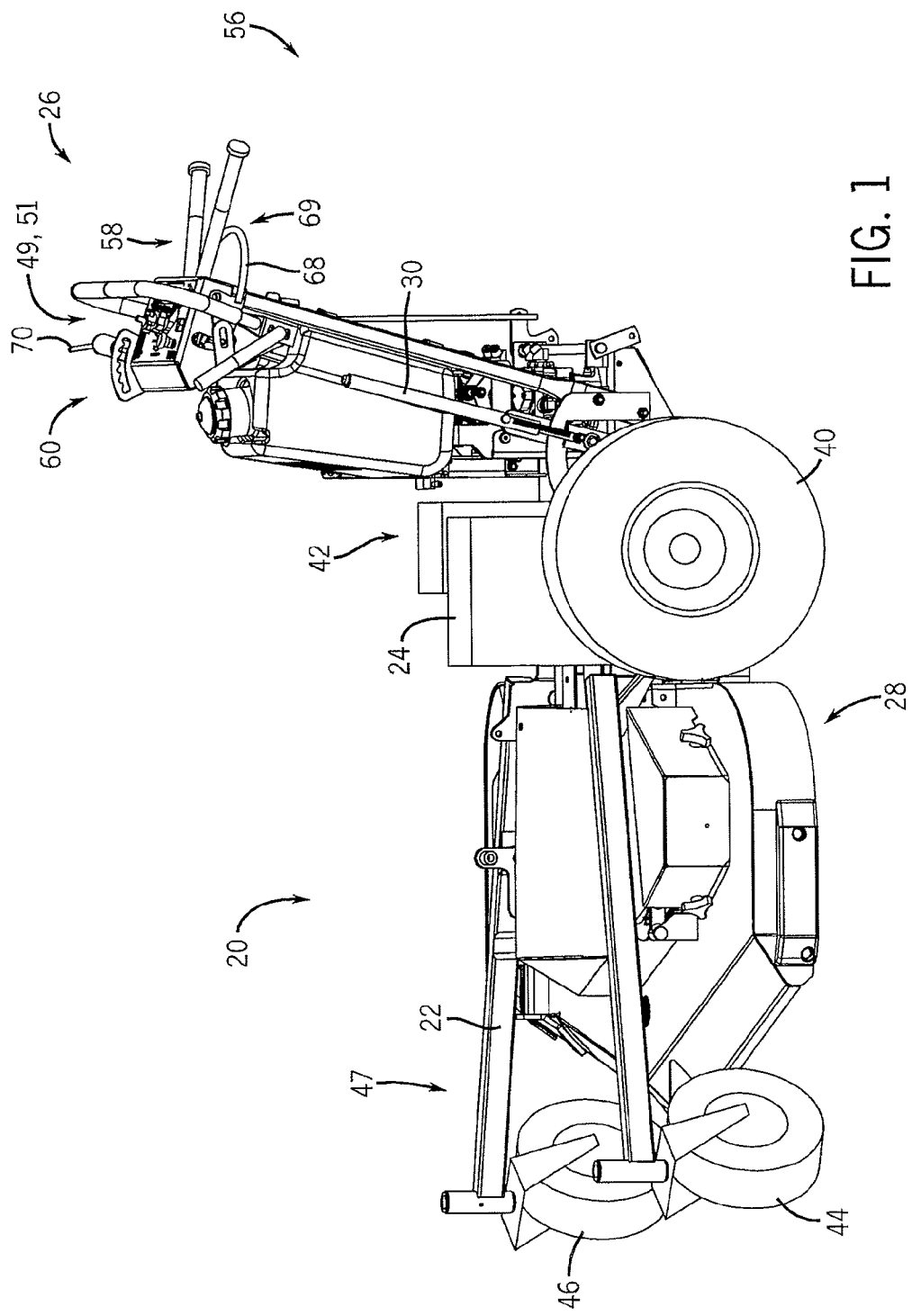
FIG. 1 is a left-side elevational view of a lawnmower equipped with a control system according the present invention.

The drawings illustrate a preferred exemplary embodiment of a preferred embodiment of the invention as incorporated into a walk behind zero turn lawnmower 20. Understandably, one of ordinary skill in the art will appreciate that the control system as disclosed herein is usable with other equipment configurations such stand-on mowers, riding mowers, or other equipment categories such as power buggies, utility carts, or the like. Generally, various configurations of these types of machines are generically defined by the term utility vehicle or a vehicle have more uses that for merely recreational transportation. With respect to the embodiment of a self-propelled zero turn walk behind mower illustrated in the accompanying drawings, it will be appreciated that like reference numerals represent like parts throughout the drawings.

Figure 2:
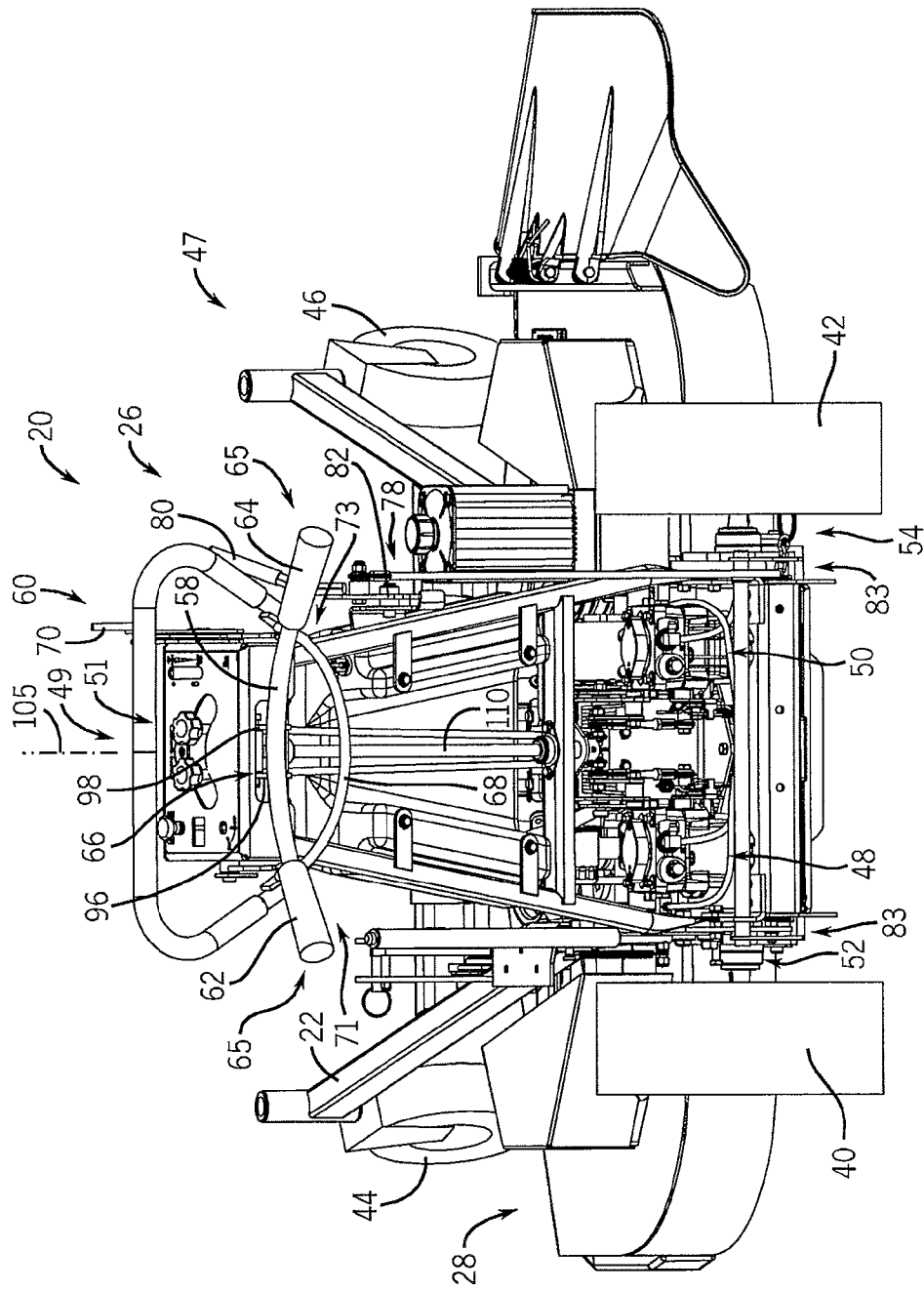
FIG. 2 is a rear end elevational view of the lawnmower shown in FIG. 1.
Figure 3:
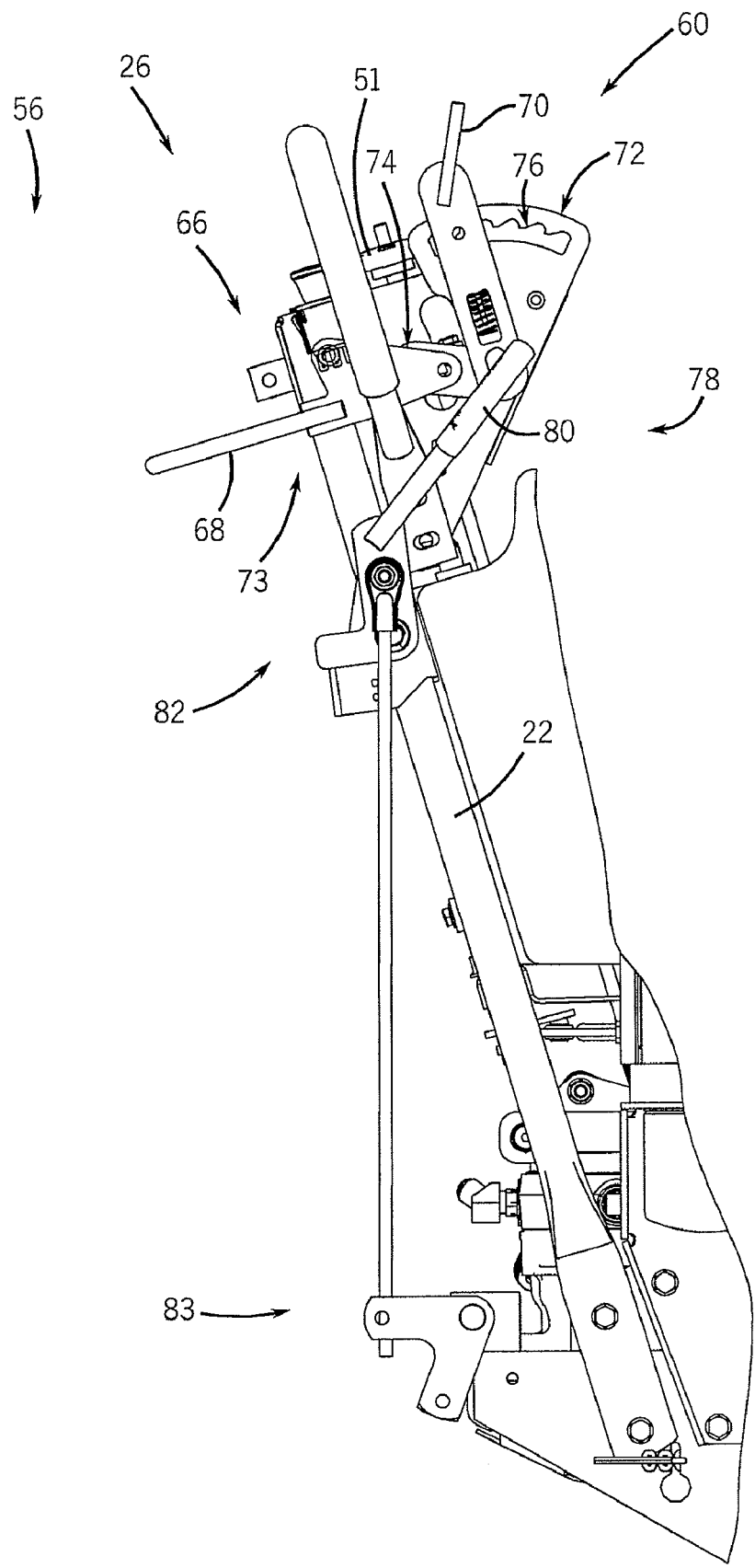
FIG. 3 is a right side elevational view of a portion of the lawnmower shown in FIG. 1.

Referring to FIGS. 1-3, walk-behind, self-propelled lawnmower 20 includes a frame 22 having an engine 24, a control system 26, and a mower deck 28 supported thereon. A pair of independently-driven drive wheels 40 and 42 and a pair of casters 44, 46 are attached to frame 22 to elevate mower deck 28 above a cutting surface. Drive wheels 40, 42 are operatively connected to engine 24 and control system 26 to drive lawnmower 20. Casters 44, 46 are undriven and are pivotally attached at a front end 47 of frame 22 relative to a forward direction of travel of mower 20. Deck 28 of this embodiment is positioned between drive wheels 40 and 42 and casters 44 and 46 and is a multi-blade cutting deck 28 and includes multiple rotating cutting blades which are positioned and driven in a conventional manner. Understandably, deck 28 could alternatively be a single blade cutting deck. It is also appreciated that deck 28 is movably attached to frame 22, thereby allowing a user to specify a distance of deck 28 from a cutting surface to provide a number of desired cutting heights. A deck adjustment lever 30 allows an operator to raise and lower deck 28 when the operator is positioned proximate control system 26.

Referring specifically to FIG. 2, a pair of variable flow hydraulic displacement pumps 48, 50 are positioned rearward of the drive wheels 40 and 42 and provide the hydraulic pressure associated with the operation of each of the drive wheels 40 and 42, respectively. Each hydraulic displacement pump 48, 50 is mechanically interconnected to impel a hydraulic, low speed, high-torque motor 52, 54 to drive the associated drive wheel 40, 42. Collectively, each side pair of a pump and a motor forms a drive of lawnmower 20. That is, pump 48 and motor 52 form a first drive and pump 50 and motor 54 form a second drive. Preferably, each variable displacement pump 48, 50 is an axial-piston type pump which includes an internal tilting swash plate (not shown) which can be rotated to vary the pump discharge rate from a zero flow, also referred to as neutral, up to a maximum flow in either the forward or reverse directions. A pair of calibration bodies, or tuning control dials 49, 51 extend from mower 20 and are configured to allow an operator to calibrate the output of each respective pump 48, 50 such that mower 20 moves in a straight line when no turning function is being performed. Such operation is discussed further below with respect to FIG. 5.

Control system 26 is positioned proximate an operator control area 56. Control system 26 includes a handlebar 58 and a speed control linkage 60 which controls operation of pumps 48, 50. Handlebar 58 is attached to frame 22 and the remainder of control system 26 such that an operator can control the direction and speed of lawnmower 20 by simply moving handlebar 58 with respect to lawnmower 20. Handlebar 58 includes a left or first grip portion 62 and a right or second grip portion 64 that are located at generally opposite ends of handlebar 58. A yoke assembly 66 connects handlebar 58 to the frame 22 of the lawnmower 20 such that the handlebar 58 can move in a side-to-side or lateral direction and an up-and-down or vertical direction. As described further below with respect to FIGS. 10-13, the position of handlebar 58 relative to lawnmower 20 controls the operation of motors 52, 54 and therefore, controls the direction and speed of travel of lawnmower 20. Understandably, the lateral and vertical movement of handlebar 58 could be facilitated with any of a linear, pivotal, or swivel connection between handlebar 58 and control system 26. That is, it is appreciated that various connection modalities are available to provide the lateral and vertical movement of handlebar 58 beyond the assembly connection configuration shown in the appended drawings.

A grip system 65 is included in each grip portion 62, 64 of handlebar 58. Each grip system 65 is configured to be contacted by an operator controlling mower 20. Each grip system 65 preferably requires a minimum or a threshold contact to maintain continued operation of mower 20. That is, the grip must be engaged for the lawnmower 20 to run under certain operating conditions, such as when the mower is not in neutral. Preferably, grip system 65 is configured to monitor handlebar 58 to detect the presence of an operator. More preferably, this monitoring occurs at intervals of, e.g., approximately every 0.5 seconds, although other durations are envisioned. Grip system 65 relies on a minimum threshold contact by the operator to allow movement of mower 20. A preferred grip is the Senso-GRIP® as manufactured by MAGURA®. Accordingly, handlebar 58 is grip pressure independent and configured to allow operation of mower 20 even though an operator's hand(s) may not be generally wrapped about either one of grip portions 62, 64. That is, grip system 65 functions as an operator presence detector rather than an operator' grip pressure detector. This pressure independence provides for reduced operator effort and fatigue in interacting with mower 20. Additionally, grip system 65 provides for a control interface with a reduced number of movable parts. Furthermore, as grip system 65 is grip pressure independent, handlebar 58 reduces the potential for operators' developing carpal tunnel syndrome as a result of repeatably compressing a lever actuated dead-man like switch which generally include a pair of oppositely oriented levers that must be squeezed together. Grip system 65 could be configured to operate according to various principles including piezoelectric, pneumatic, humidity, or capacitance. Furthermore, grip system 65 could be integrated in a number ways with mower 20. That is, grip system 65 can be configured to allow starting and operation of engine 24 and only interfere with the operation of mower 20 when deck 28 is operating or mower 20 is moving. Preferably, if either the mower is moving or the deck is operating, if grip system 65 does not detect the contact presence of an operator at one of grip portions 62, 64, grip system 65 interrupts operation of mower 20, engine 24, and/or deck 28. Grip system 65 is integrated with control system 26 to terminate operation of engine 24 thereby stopping operation of mower 20.

An interlock, a speed limiter, or reference bar 68 extends from lawnmower 20 generally beneath handlebar 58. Reference bar 68 is movably attached to mower 20 to define a range of motion of handlebar 58 during various operating condition of mower 20. Limiting the range of motion of handlebar 58 with reference bar 68 limits the operating speed that can be attained as determined by the position of reference bar 68 relative to handlebar 58. During high speed operation of mower 20, reference bar 68 allows for a greater range of motion of handlebar 58 and during lower speed operation of mower 20, reference bar 68 limits the range of motion of handlebar 58 thereby limiting the operational speed of mower 20.

Figure 10:
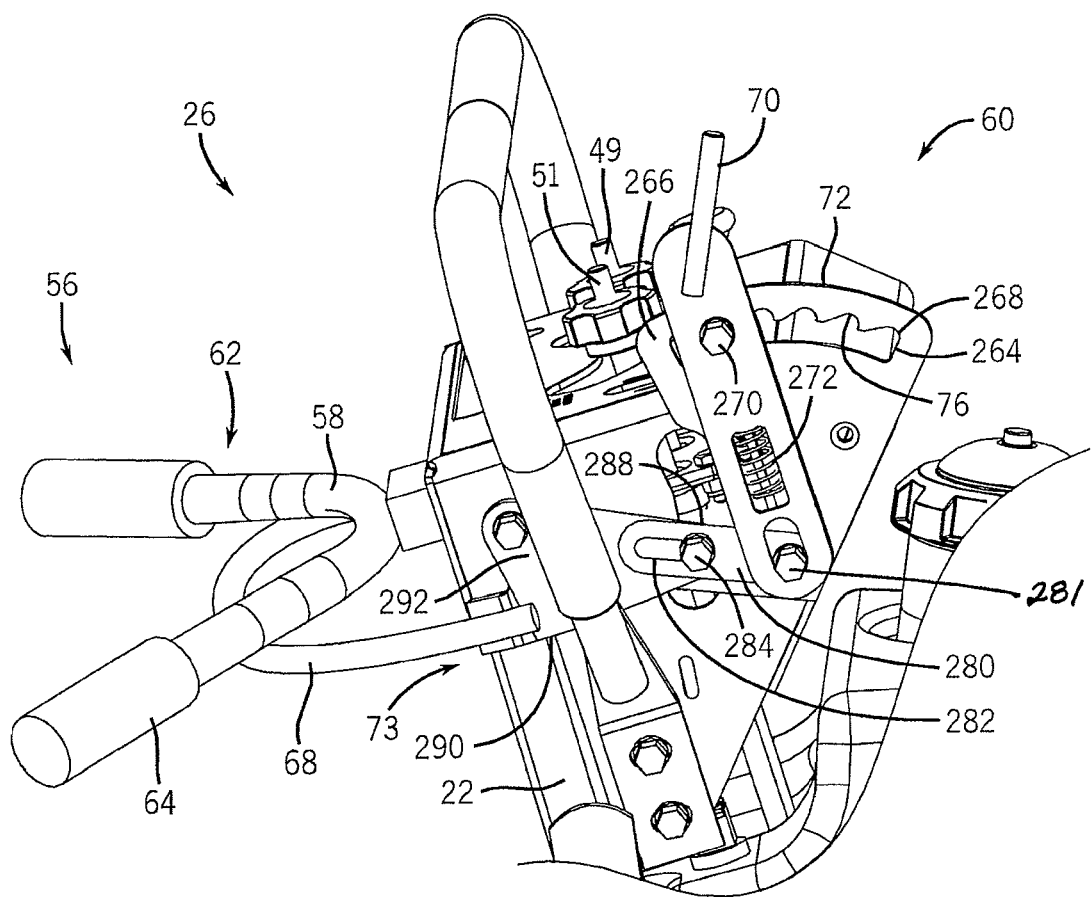
FIG. 10 is a side elevational view similar to FIG. 3 showing the orientation of a handlebar relative to a speed reference bar when a speed control lever is oriented in a first position.

As best shown in FIG. 10, reference bar 68 is operationally connected to speed control linkage 60 to provide a variable distance 69 between handlebar 58 and reference bar 68. Reference bar 68 has a generally curvilinear shape that extends between a pair of ends 71, 73 that are pivotably connected to mower 20. End 73 is operationally connected to speed control linkage 60 so that the relative position of the speed control linkage 60 defines the position of reference bar 68 relative to handlebar 58. Variable distance 69 determines a range of motion of handlebar 58 and, thereby, an operating speed range of lawnmower 20. Understandably, although reference bar 68 is shown as extending rearward of lawnmower 20 generally beneath handlebar 58, other constructions are envisioned and within the scope of the claims. That is, reference bar 58 could be configured to interact with any of a number of links of control system 26 or interact with handlebar 58 without otherwise extending from lawnmower 20. The term "bar" therefore should not be narrowly construed to be limited to any particular shape.

As shown in FIG. 3, speed control linkage 60 includes a control lever 70, a control plate 72, and a reference bracket 74. As described further below with respect to FIGS. 10 and 11, operator manipulation of control lever 70 controls the maximum operating speed of pumps 48, 50. Understandably, control lever 70 could be configured to also control the operating condition of engine 24. Manipulation of control lever 70 relative to control plate 72 determines, in part, the position of reference bar 68 relative to handlebar 58. A number of notches or catches 76 are formed in control plate 72 and are configured to maintain control lever 70 in the desired position relative to lawnmower 20. Such a construction allows an operator to maintain two hand contact with handlebar 58 after the operator has configured lawnmower 20 for desired operation.

A brake system 78 [FIGS. 2 and 3] is also positioned proximate speed control linkage 60. Brake system 78 includes a brake lever 80 that is pivotably connected to frame 22 of lawnmower 20. A brake linkage 82 extends between brake lever 80 and a drive interlock 83 that is constructed to interfere with the operation of drive wheels 40, 42 so that lawnmower 20 cannot move when brake system 78 is engaged. Orienting speed control linkage 60 and brake lever 80 on a common side of lawnmower 20 allows an operator to adjust the operating condition of lawnmower 20 while maintaining at least one hand in engagement with handlebar 58.

Figure 4:
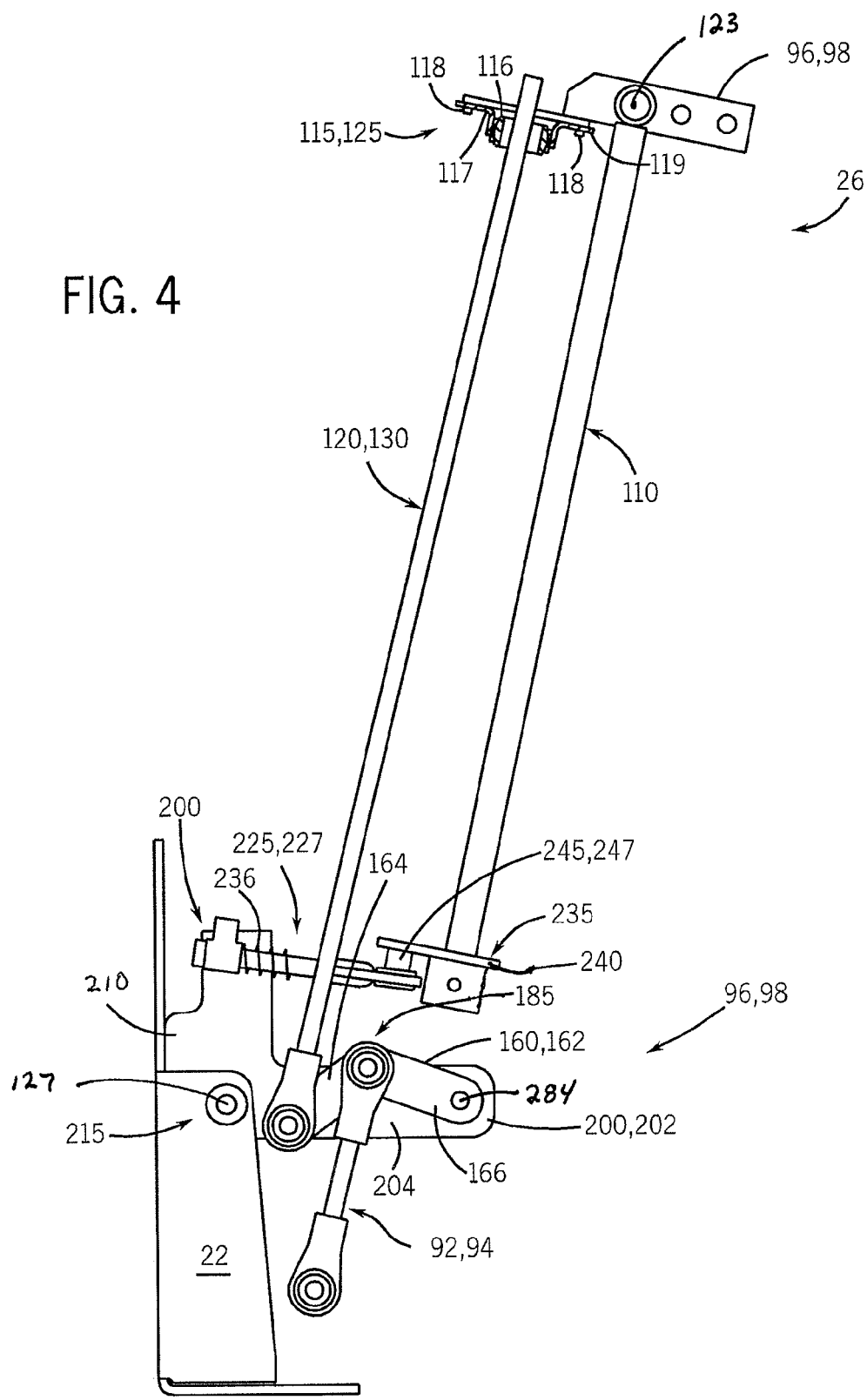
FIG. 4 is a side elevational view of a drive and control linkage system of the lawnmower shown in FIG. 1.

FIG. 4 is an elevational view of a drive and control linkage system of control system 26 of lawnmower 20. FIGS. 5-9 show respective portions of control system 26 in various orientations achieved during operation of lawnmower 20. Referring to FIGS. 4-9, and as previously mentioned, the swash plate of each pump 48, 50 is rotated by a shaft 84, 86 that extends out of a side of the pumps 48, 50, respectively. Each shaft 84, 86 is driven to rotate by a swash plate drive linkage or lever assembly 88, 90 to which an associated drive rod 92, 94 is connected.

Figure 5:
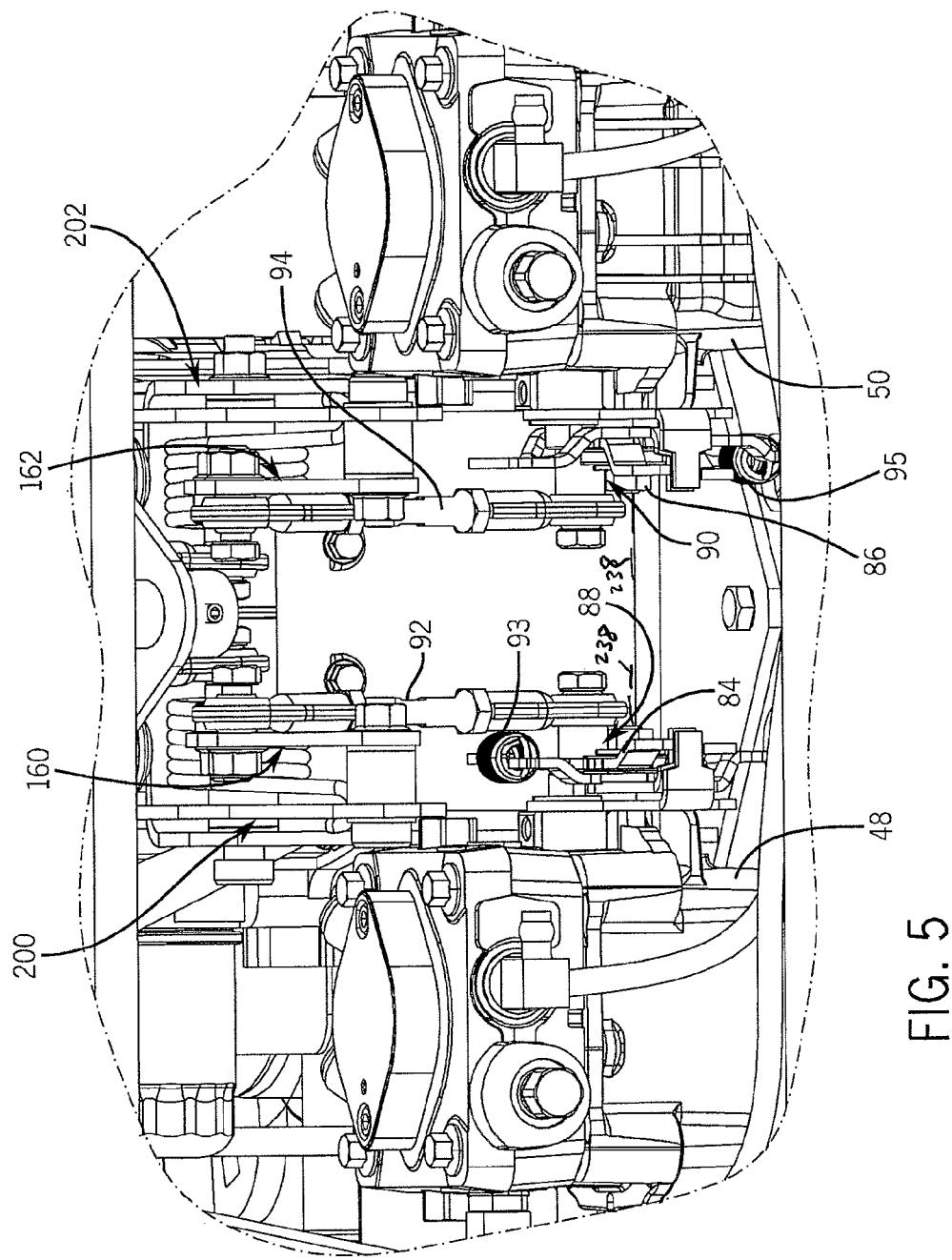
FIG. 5 is an elevational view of a portion of the drive and control linkage system shown in FIG. 5.
Figure 6:
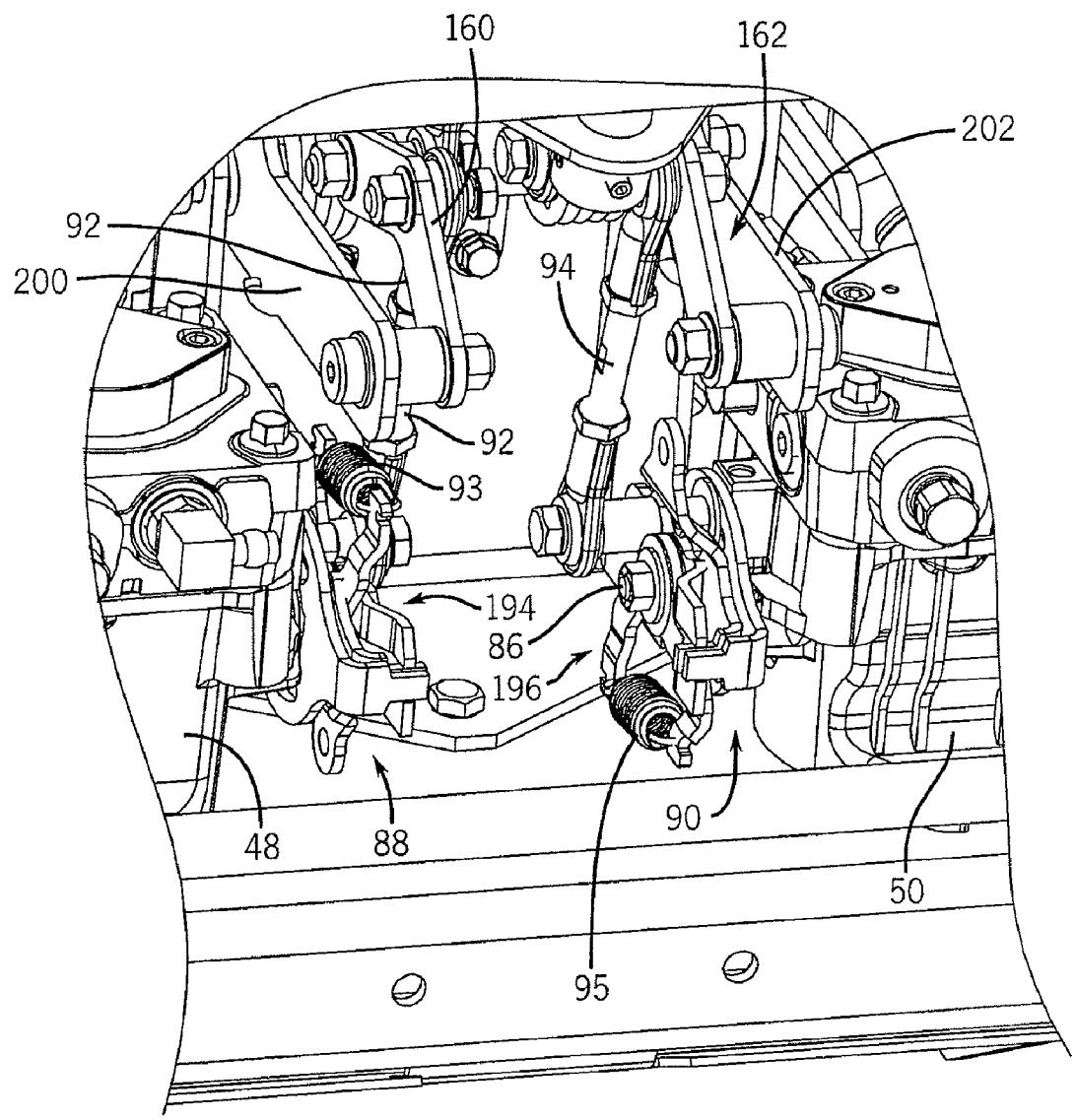
FIG. 6 is detailed view of the portion of one of the control linkages shown in FIG. 5.
Figure 7:
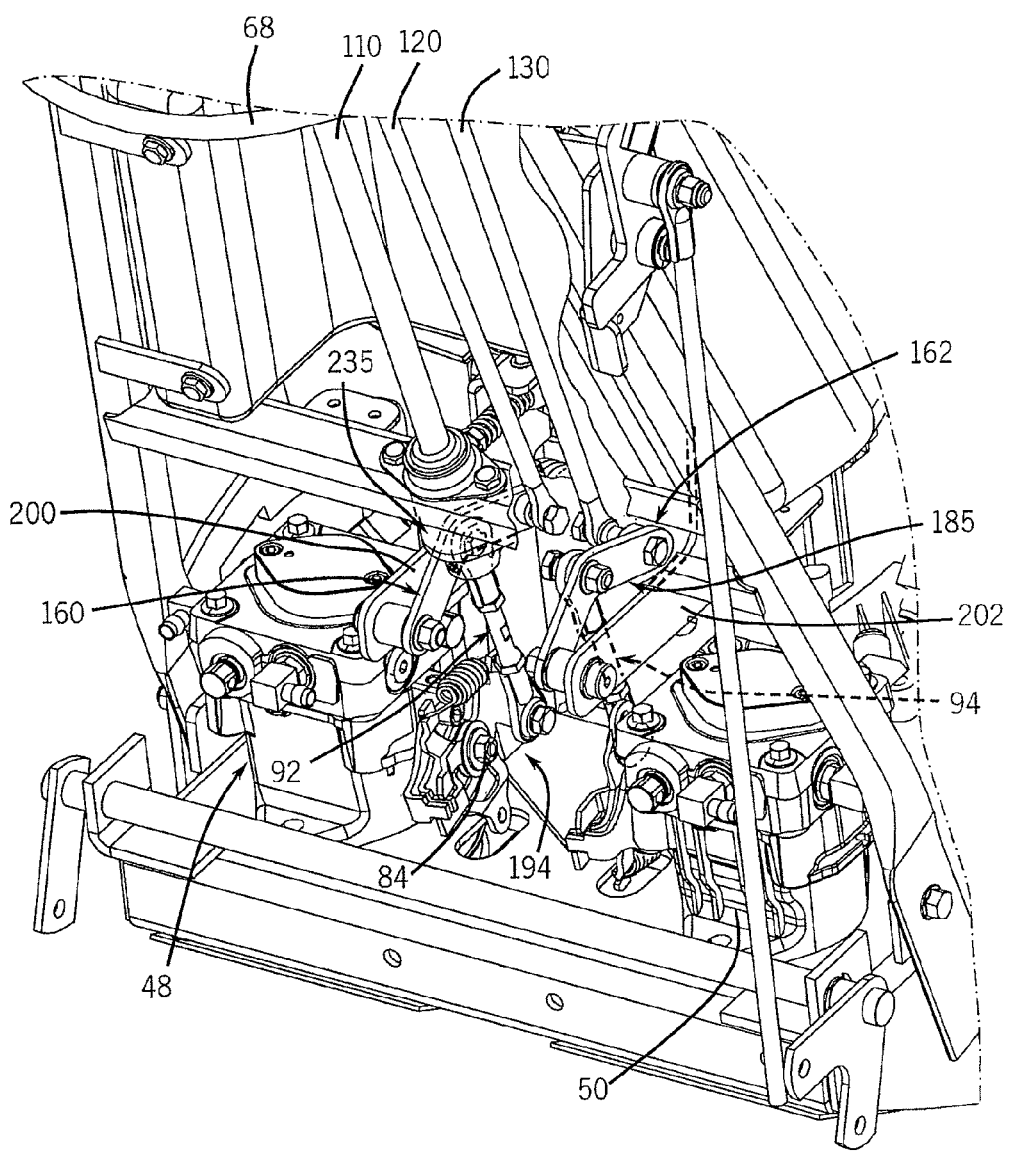
FIG. 7 is a detailed view of a second of the control linkages shown in FIG. 1 with the respective links oriented in a first position.
Figure 8:
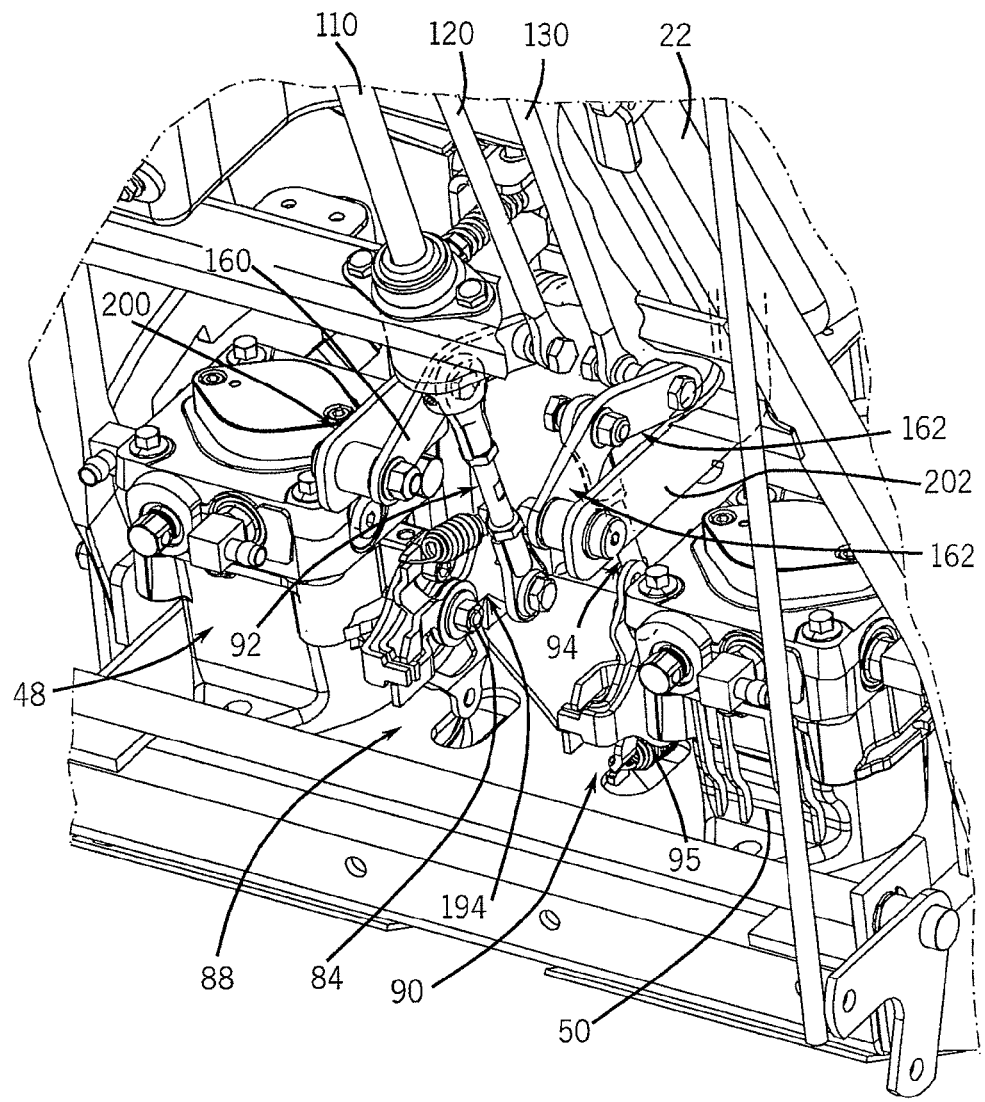
FIG. 8 is a view similar to FIG. 7 with the control linkages moved to a second position.
Figure 9:
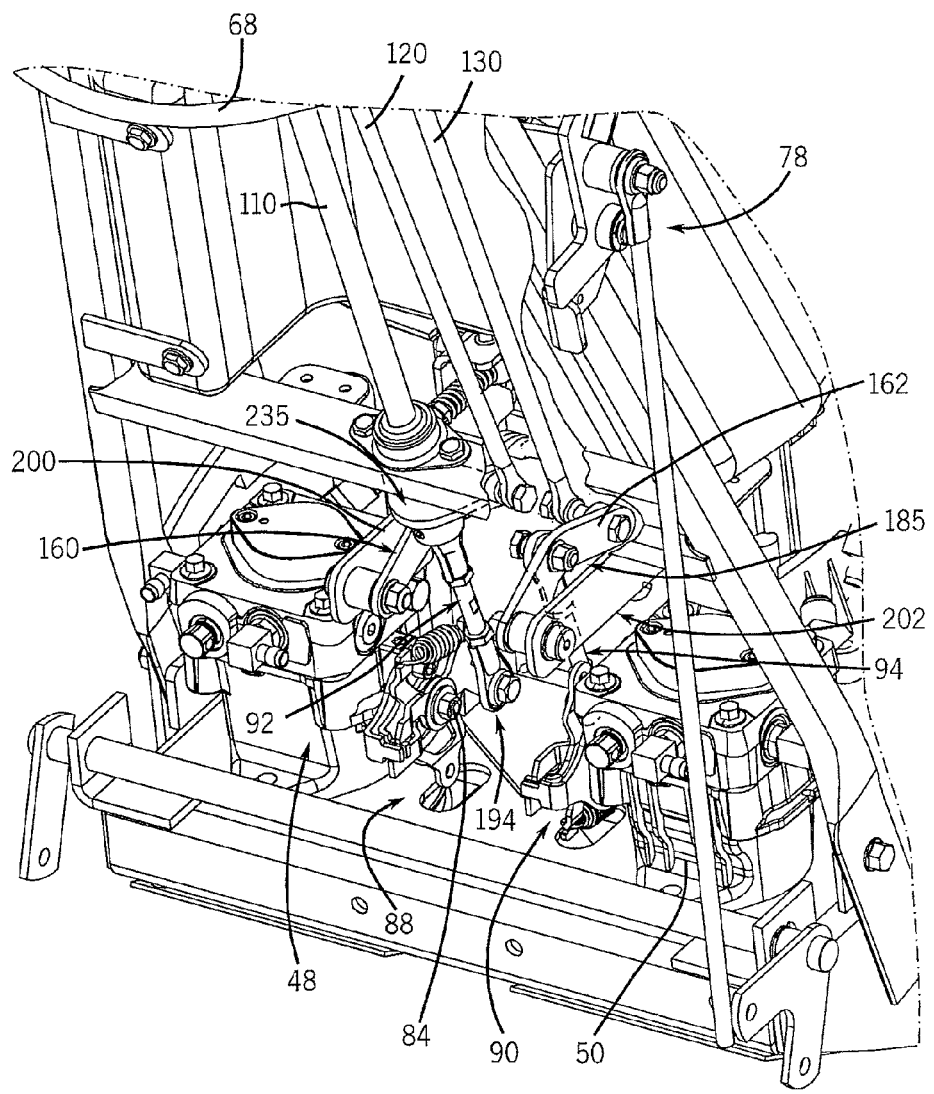
FIG. 9 is an elevational view of an intermediary support of the drive and control system shown in FIG. 4.

Each lever assembly 88, 90 is biased to a neutral position by a return spring 93, 95. As best seen in FIGS. 4-6, the lever assemblies 88, 90 are inverted relative to one another such that the return spring 93 of left pump 48 is positioned above the shaft 84 of left pump 48 and the return spring 95 of the right pump 50 is positioned below the shaft 86 of the right pump 50. This permits motion of the drive rods 92, 94 in the same direction (i.e. up or down) to result in turning of the shafts 84, 86 in the same direction despite the fact that the pumps 48, 50 are facing each other and, therefore, of opposite orientations.

Handlebar 58 is rotatable about generally vertical axis to steer the lawnmower 20. As shown in FIG. 2, a left linkage 96 and a right linkage 98 extend from handlebar 58 generally between grip portions 62, 64. The left linkage 96 is located on one side of a longitudinal center line 105 of lawnmower 20 generally opposite right linkage 98. Referring to FIGS. 2 and 4, handlebar 58 is mechanically connected to a generally vertical steering shaft 110 via the linkages 96, 98 to rotate with a steering shaft 110 about the axis of the steering shaft 110. This relation controls steering of the mower 20 in the left and right turn directions. The forward end of left generally linkage 96 is pivotally connected by a flex joint 115 at an upper end of a first or left vertical drive rod 120 that is mechanically connected to the lever assembly 88 of hydraulic pump 48. In a similar manner, the forward end of the right linkage 98 is pivotally connected by a flex joint 125 at an upper end of a second or right generally vertical drive rod 130 that is mechanically connected to the lever assembly 90 of the hydraulic pump 50. Each flex joint 115 and 125 allows movement of the inter-coupled linkages in multiple directions.

Figure 13:
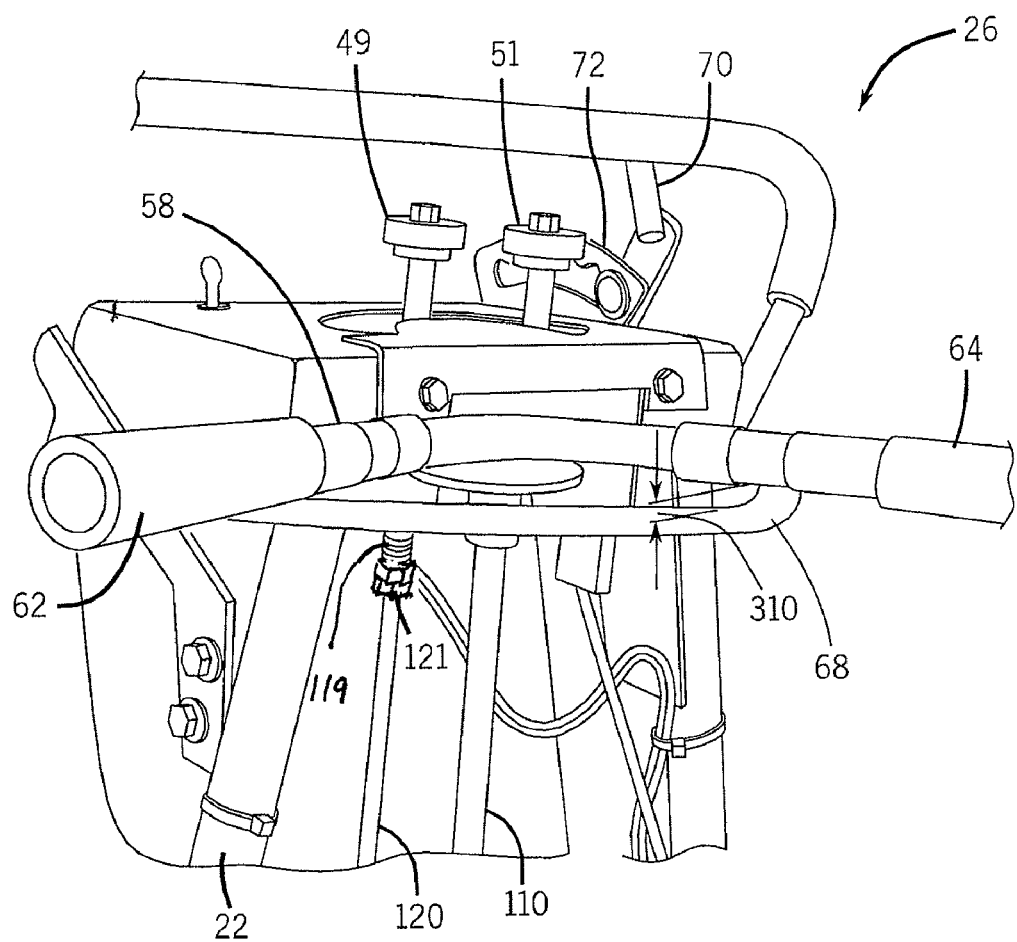
FIG. 13 is a view similar to FIG. 2 and shows the position of the handlebar relative to the speed reference bar during a turning operation of the lawnmower.

Each flex joint may, for instance, comprise a simple pivotable hinge joint or a more involved multi-directional pivot such as a ball and socket connection. As shown, each flex joint 115 includes a shoulder 116 that is pivotably connected to frame 22 by adjoining plates 117. A number of fasteners 118 secure respective plates 117 to frame 22 while allowing drive rods 120, 130 to move relative thereto. As shown in FIG. 13, a spring 119 is engaged with each drive rod 120, 130 and returns the respective drive rods to a neutral drive position when there is no operator interaction with handlebar 58. An adjuster 121, such as a pair of nuts, is operationally engaged with drive rods 120, 130 and configured to allow tuning of the return force associated with each of spring 119 of each vertical drive rod 120, 130 respectively. Such a construction secures drive rods 120, 130 to mower 20 while allowing the rods 120, 130 to be translated rotationally and linearly with respect to frame 22. That is, such a construction allows the adjustment of each of drive rods 120, 130 throughout the operational range of movement of handlebar 58.

Referring to FIGS. 1 and 2, handlebar 58 is vertically movable to adjust the operating speed of the lawnmower 20. Preferably, handlebar 58 is pivotable about a horizontal axis 123 as shown in FIG. 4. In the preferred embodiment, the pivot axis is located between the left and right grip portions 62, 64 and the flex joints 115 and 125 and intersects the generally vertical axis of the steering shaft 110. Handlebar 58 pivots about the horizontal axis such that downward motion of the left-hand and right-hand grip portions 62, 64 of the handlebar 58 causes both the left and right drive rods 120 and 130 to rise or move in an upward direction to drive the lawnmower forward at a rate that is proportional to the pivot stroke of the handlebar 58. Similarly, upward motion of grip portions 62, 64 causes downward movement of both the left and right drive rods 120 and 130, again at a rate that is at least generally proportional to the structure of the handlebar 58. As discussed in more detail below, maximum forward speed is limited by handlebar contact with the reference bar 68. As discussed above, vertical movement of handlebar 58 translates drive rods 120, 130 relative to flex joints 115, 125, respectively.

Referring to FIGS. 4-9, the lower end of each left and right generally vertical drive rods 120 and 130 is pivotally coupled to a V-shaped linkage 160 and 162 which are operatively connected to pumps 48, 50, respectively. Each V-shaped linkage 160 and 162 includes a forward leg 164 and a rearward leg 166 that extend in generally opposite directions from a vertex or elbow 185 of the linkage 160, 162. The lower end of each drive rod 120 and 130 is pivotally coupled to the forward leg 164 of a respective V-shaped linkage 160 and 162. Each of the pair of drive rods 92, 94 has a first end that is pivotally coupled to each V-shaped linkage 160, 162 proximate elbow 185 and a second end that is pivotably connected to a swash plate drive linkage 194, 196 associated with each pump 48, 50. The rearward leg 166 of each V-shaped linkage 160 and 162 is pivotally coupled to an L-shaped control pivot plate 200 and 202.

As shown best in FIG. 4, each L-shaped control pivot plate 200 and 202 generally includes a horizontal leg 204 and a vertical leg 210 which are generally perpendicular to one another. An elbow 215 is formed at the intersection of the horizontal leg 204 and the vertical leg 210. The free end of each horizontal leg 204 of each L-shaped control pivot plate 200, 202 is pivotally coupled to the rearward leg 166 of each V-shaped linkage 160, 162, respectively. The elbow 215 of each L-shaped control pivot plate 200 and 202 is pivotably coupled to frame 22 of mower 20 such that each L-shaped control pivot plate 200, 202 can rotate about a generally horizontal axis 127.

Figure 12:
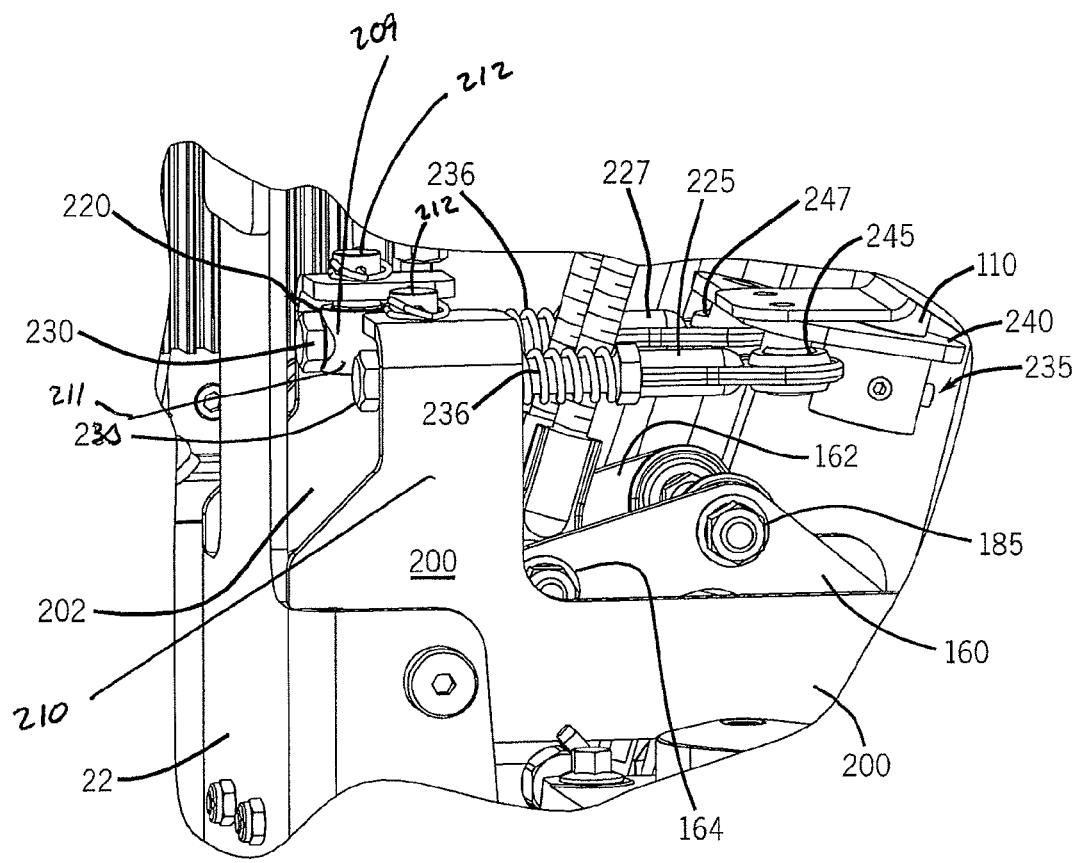
FIG. 12 is a detailed view of an adjustor of the drive and control system shown in FIG. 3.

Referring to FIGS. 4 and 12, a pivotable swivel 209 is attached to a free end of each vertical leg 210 of each L-shaped control pivot plates 200 and 202. Each pivotable swivel 209 includes a body 211 having an opening 220 that is constructed to engage a generally horizontally aligned steering rod 225, 227. A stem 212 extends from body 211 and pivotably engages a respective pivot plate 200, 202. A forward end of each steering rod 225 and 227 includes a head 230 that is configured to operatively engage the pivotable swivel 209 attached to the L-shaped control pivot plate 200 and 202, respectively such that each of steering rods 225, 227 is slidably engaged a respective swivel 209. An opposite rearward end of each steering rod 225 and 227 is pivotally coupled to a yoke 235 located at a lower end of the generally vertical steering shaft 110. A spring 236 is engaged with each steering rod 225, 227 between head 230 and yoke 235 and biases steering rod 110 to a neutral position when no lateral force is exerted on handlebar 58.

Yoke 235 is generally triangular and defines a rearward vertex 240 and left and right forward vertices 245, 247. The steering shaft 110 is fixedly attached at the rear vertex 240 such that the yoke 235 rotates with rotation of the steering shaft 110. The left vertex 245 is pivotally coupled at a rear end of the left steering rod 225, while the right vertex 247 is pivotally coupled at a rear end of the right steering rod 227. Yoke 235 is constructed to communicate the multi-directional translation of handlebar 58 to the linkages associated with the operation of pumps 48, 50 and the swash plates thereof. During a turning operation rotation of steering shaft 110 compresses one of springs 236 associated with one of steering rods 225, 227 depending on the direction of the turning operation. If the operator releases the turning pressure of handlebar 58, springs 230 return steering rods 225, 227, and therefore steering shaft 110 and handlebar 58, to a neutral, or non-turning orientation.

Having generally described the construction of the control system 26, the following is a general description of the operation of lawnmower 20. For purposes of example only, assume that handlebar 58 is positioned in neutral such that there is no forward reverse movement of the mower 20.

Analogous to steering a bicycle, clockwise rotation of handlebar 58 causes mower 20 to turn to a right direction and counterclockwise rotation of handlebar 58 causes mower 20 to turn to in a left direction. Referring to FIGS. 10-13 with respect to the position of handlebar 58, and the remaining Figs. for the associated linkage, and first to right-hand turning, the steering movement of the handlebar 58 is communicated to yoke 235 through rotation of the vertical steering shaft 110 about its axis. Yoke 235 converts the rotating moment of the vertical steering shaft 110 to linear movement of both the left and right steering rods 225 and 227 generally in a fore and aft direction relative to the frame 22. Specifically, clockwise rotation of handlebar 58 and yoke 235 causes forward movement of the left steering rod 225, and rearward movement of the right steering rod 227. The forward moving left steering rod 225 slides through the opening 220 in the swivel 209 attached to the left L-shaped control pivot plate 200, resulting in no movement of L-shaped control pivot plate 200. The left drive wheel 40 therefore continues to rotate at the commanded speed. Rearward movement of the right steering rod 227 causes head 230 of right steering rod 227 to operatively engage the swivel 209 connected to the right L-shaped control pivot plate 202. The engagement of the right steering rod 227 with swivel 209 of the L-shaped control pivot plate 202 causes pivot plate 202 to rotate about axis 127 as noted in FIG. 4. The downward rotating movement of the horizontal leg 204 of the L-shaped control pivot plate 202 causes the drive rod 94 to pivot the swash plate drive linkage downwardly about its axis of rotation, thereby reducing the operating speed of right drive wheel 42 and causing mower 20 to turn in right direction due to the speed differential between drive wheels 40, 42.

In a similar manner, counterclockwise rotation of the handlebar 58 rotates steering shaft 110 thereby causing yoke 235 to rotate in a counterclockwise manner. The counterclockwise movement of yoke 235 causes generally rearward linear motion of the left steering rod 225, and forward linear motion of the right steering rod 227. The rearward moving head 230 of left steering rod 225 engages against the swivel 209 of the left L-shaped control pivot plate 200 and causes downward rotation of L-shaped control pivot plate 200. Concurrently, right steering rod 227 passes through opening 220 of swivel 209 of the right L-shaped control pivot plate 202 thereby preventing right steering rod 227 from interfering with the position of the right side L-shaped control pivot plate 202. The downward movement of L-shaped control pivot plate 200 moves the left drive rod 190 and left swash plate drive linkage 90 downwardly, thereby reducing the operational speed of drive wheel 40 and causing the mower 20 to turn left due to the speed differential between drive wheels 40, 42.

Comparatively, when speed control lever 70 is located in the neutral position, both pumps 48, 50 are disabled provided handlebar 58 is maintained in a central neutral position. When handlebar 58 is moved to one side or the other, a respective pump 48, 50 is enabled while the other pump remains in the neutral position. This configuration allows lawnmower 20 to pivot about a non-driven wheel through operation of only one of drive wheel 40, 42 while the other drive wheel is free to rotate. Additionally, further lateral, or steering translation of handlebar 58, causes one of springs 236 associated with steering rods 225, 227 to be fully compressed against the associated pivot 209 and to thereafter translate the corresponding pivot plate 200, 202 in a reverse direction with respect to the other of the pivot plates 200, 202. As a result, continued translation of handlebar 58 results in counter rotation of pivot plates 200, 202 which yields reverse directional operation of pumps 48, 50. Such a configuration allows mower 20 to perform a counter tire rotation and yields a zero-turn radius turn function without detrimentally affecting the supporting surface with tire skidding.

When the drive system is shifted out of a neutral configuration, vertical movement of handlebar 58 relative to a neutral position controls the forward and reverse linear travel of mower 20. Downward rotational movement of handlebar 58 about the horizontal axis from a neutral position (illustrated by arrow 248 in FIG. 11) causes upward movement of the left and right vertical drive rods 120, 130. The upward movement of the vertical drive rods 120, 130 from a neutral position drives the forward leg 164 of both V-shaped linkages 160 and 162 upwardly about the rearward leg 166 so as to cause upward movement of the left and right drive rods 92, 94 and swash plate drive linkages 88 and 90. Upward movement of each of the left and right swash plate drive linkages 88 and 90 about its axis 238 of rotation (FIG. 5) causes forward propulsion of corresponding the left and right hydraulic pumps 48, 50, which drives forward motion of the motors and drive wheels 40 and 42 so as to cause forward movement of the mower 20 at a speed proportional to the magnitude of the movement of steering handlebar 58.

In an opposite manner, upward movement of the handlebar 58 causes downward movement of both the left and right drive rods 120, 130. The downward movement of the left and right drive rods 120, 130 causes downward rotational movement of the leg 164 of both V-shaped linkages 160 and 162 about the rearward leg 166 of the V-shaped linkages 160 and 162, which causes downward movement of the left and right drive rods 92, 94 and swash plate drive linkages 88 and 90 so as to cause reverse propulsion of the left and right hydraulic pumps 48, 50 and corresponding reverse motion of the drive wheels 40 and 42. The mower 20 moves in a reverse direction at a speed proportional to the magnitude of the movement of handlebar 58.

Referring now specifically to FIGS. 3 and 10-13, a vertical stroke of handlebar 58 is determined by the position of the reference bar 68 and, thus, the stroke of control lever 70 relative to control plate 72. Speed control linkage 60 is constructed such that control lever 70 can engage any one of the number of catches 76 formed in control plate 72. Speed control linkage 60 is constructed to be single hand operable and configured to retain an operating orientation of control system 26. That is, an operators setting of control lever 70 orientates reference bar 68 relative to handlebar 58 and thereby defines an operational speed range of mower 20. As described further below, control linkage 60 is also configured to require two distinct operator actions to facilitate increasing the operating speed of mower 20, but only one action to reduce the operating speed of mower 20. Such a construction allows an operator to quickly decelerate mower 20 in the event deck 28 encounters an obstruction. Such a configuration allows control lever 70 to mechanically interlock at selected positions relative to control plate 72 so as to define the maximum operating speed of pumps 48, 50 and thereby the maximum operating speed of wheels 40, 42.

Control plate 72 includes an elongated slot 264 which receives a lateral sliding dog 270 attached to control lever 70. When the control lever 70 engages against a rear end 266 of the slot 264, the mower 20 is in neutral such that there is no uniformly forward propulsion of the hydraulic pumps 48, 50 and no correlated uniformly forward movement of the drive wheels 40 and 42. Although this neutral position of control lever 70 prevents forward travel of mower 20, handlebar 58 can be moved laterally relative to mower 20, thereby allowing mower 20 to be turned even through the lateral drive control lever is in a neutral configuration. Forward movement of the control lever 70 towards a front end 268 of the slot 264 causes increasing propulsion speed of the hydraulic pumps 48, 50 to be communicated to drive wheels 40 and 42. That is, the further forward control lever 70 is positioned relative to slot 264, the faster mower 20 can travel.

Each of catches 76 is constructed to operatively engage slideable dog 270 attached to control lever 70. Dog 270 is slideable in a downward direction but is retained in engagement with a respective catch 76 by a biasing spring 272. Each of the series of catches 76 includes a rear portion that is at less of an angle relative to a front portion of the catches 76 such that the control lever 70 can be rotated in a rearward direction along the slot 264 without requiring downward movement of the dog in the vertical direction. Such a construction allows an operator to simply grab and pull the control lever 70 in a rearward direction to slow or stop the mower 20 without manipulation of dog 270. To permit higher speed operation of the mower 20, the operator must manipulate dog 270 of control lever 70 to pass the forward wall of a respective catch 76. Thus, moving the control lever 70 in the forward direction requires a two stage operation that hinders unintended mower acceleration and prevents the control lever from undesirably slipping in the forward direction and jumping to a higher speed, when traveling over rough terrain.

The lower end of the control lever 70 is pivotably attached to a forward end of an elongated speed limiter link 280 about an axis 281. A rear end of the elongated speed limiter link 280 includes an elongated slot 282 configured to receive a fastener 284 that pivotally couples the elongated speed limiter link 280 to a forward vertex 288 of a triangular-shaped speed limiter reference bracket 290. An upper rearward most vertex 292 of the speed reference limiter reference bracket 290 is pivotally coupled to the frame 22 of the mower 20. End 73 of reference bar 68 is connected to the triangular-shaped speed limiter reference bracket 290 generally below vertex 292 such that positioning of control lever 70 also controls the orientation of reference bar 68 relative to handlebar 58.

As best shown in FIGS. 5-10 and 11, the exemplary reference bar 68 has a curvilinear-shape, is located underneath handlebar 58, and extends generally across the width of operator control area 56. Movement of control lever 70 relative to the control plate 72 causes a correlated up-and-down movement of the reference bar 68 relative to handlebar 58 via the elongated speed limiter link 280 and the triangular-shaped speed limiter reference bracket 290. The reference bar 68 forms a variable position stop below which handlebar 58 cannot move. When the control lever 70 is positioned against the rear end 266 of the elongated slot 264 of the control plate 72, the steering handlebar 58 cannot move past a position in which both of the hydraulic motors move from their neutral position in a forward direction. When the control lever 70 is positioned at the forward end 268 of the elongate slot 264, the handlebar 58 can move downward to its full possible stroke, permitting propulsion at the maximum possible speed.

Figure 11:
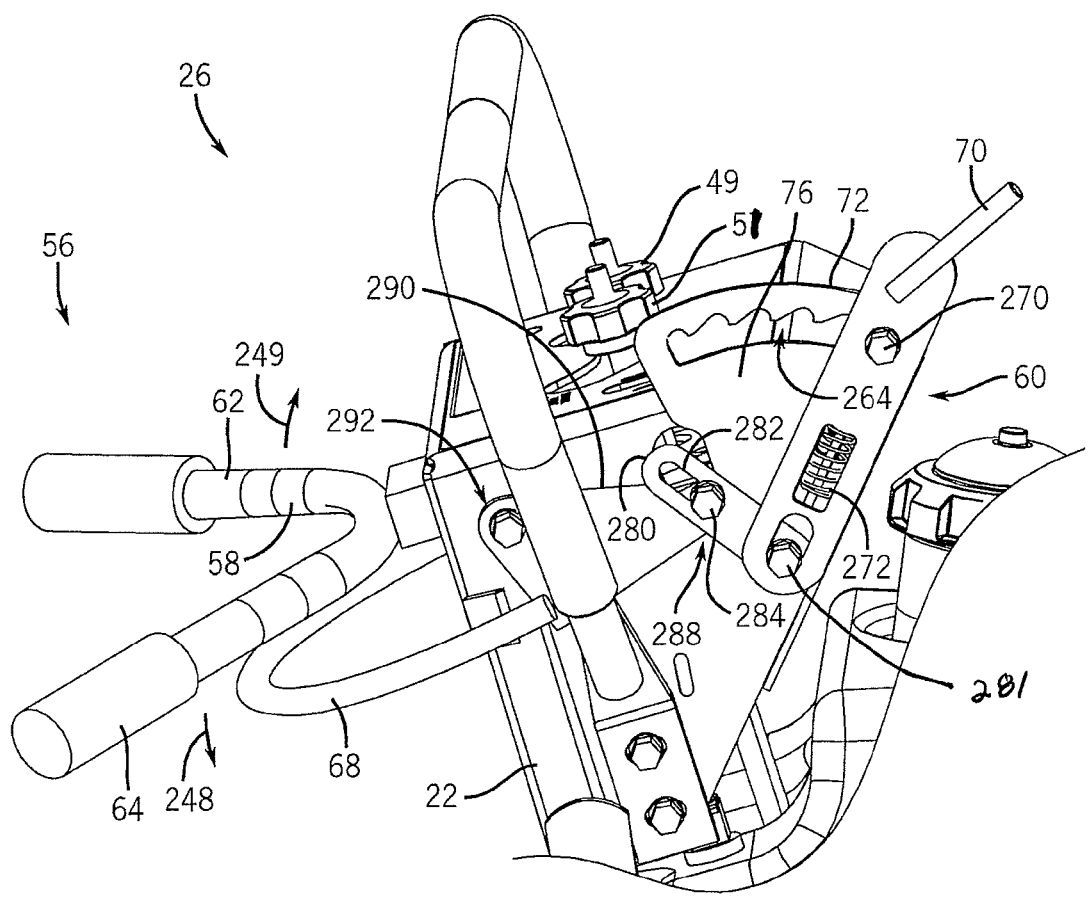
FIG. 11 is a view similar to FIG. 10 and shows the orientation of the handlebar relative to the speed reference bar when the speed control leveler is positioned in a second position.

Comparing FIGS. 11 and 13, it can be seen that when control lever 70 is located in its rearmost position (FIG. 13), reference bar 68 is maintained in relatively close proximity to handlebar 58. Comparatively, when control lever 70 is moved to its forward most position (FIG. 11), a substantial gap is formed between handlebar 58 and reference bar 68 thereby providing handlebar 58 with a greater range of motion. As control lever 70 is oriented in the locking positions associated with catches 76, reference bar 68 varies the range of movement of handlebar 58. Accordingly, the position of control lever 70 and reference bar 68 define a range of motion of handlebar 58. The range of motion of handlebar 58 defines an operating speed range of mower 20 that is within the maximum operating range of the lawnmower.

In operation, the position of the reference bar 68 is dictated by the position of speed limit control lever 70. When control lever 70 is in any position between neutral (all the way back) or full speed (all the way forward), handlebar 58, when not interfered with by an operator, maintains a handlebar neutral position wherein handlebar 58 is generally axially centered relative to mower 20 and is a variable distance above reference bar 68. As described above, downward movement of the handlebar 58 from a neutral position causes forward propulsion of both pumps 48, 50 thereby providing a forward driving force to drive wheels 40 and 42. The position of the reference bar 68 limits the downward movement of the handlebar 58 and, thereby, limits the maximum forward speed of the mower 20. When control lever 70 is oriented in the neutral position, reference bar 68 is positioned generally immediately under handlebar 58, thereby preventing handlebar 58 from moving downward and thereby preventing forward movement of mower 20. The reference bar 58 also reduces speed during a turn. Specifically, when pivoting the steering handle to turn the mower 20, engagement of the handlebar 58 against the upwardly inclined curvilinear surface of the reference bar 68 drives handlebar 58 upwardly from its central position, thereby causing mower 20 to automatically decelerate through a turn. More specifically, as illustrated in FIG. 13, one of the left-hand and the right-hand grip portions 62, 64 of the handlebar 58 maintains contact along the curvilinear shape of the reference bar 68, while a gap 310 is created between the other of the left-hand and right-hand grip portions 62, 64 of the handlebar 58 and the reference bar 68. This automatic speed reduction avoids undesired skidding of drive wheels 42, 44 during a turning operation, reduces wear of drive wheels 42, 44, and reduces the potential of wheels 42, 44 tearing up a lawn.

When mower 20 is configured for full speed operation (as shown in FIG. 11), control lever 70 is moved to the full forward position of control plate 72 thereby rotating reference bar 68 down and away from handlebar 58. Accordingly, handlebar 58 is free to be moved throughout its full range of motion. Comparatively, when control lever 70 is located in its neutral position (as shown in FIG. 13), reference bar 68 is rotated to the position generally directly below handlebar 58. Regardless, of the orientation of control lever 70, handle 58 is allowed to laterally translate relative to reference bar 68 thereby allowing turning operation of pumps 48, 50, or normal operation of one pump and destroked operation of the other pump. The curvilinear construction of reference bar 68 allows for destroked operation of the pump 48, 50 positioned generally opposite the direction of translation of handlebar 58 and provides for the increased destroking of one of the pumps as handlebar 58 is moved away from the central axis position. During a turning operation, a predetermined gap 310 is formed between the side of handlebar 58 and reference bar 68 positioned toward a turn direction. The rise of handlebar 58 associated with the engagement of handlebar 58 with reference bar 68 on a side away from the direction of the turn causes the pumps 48, 50 to automatically destroke and thereby slow down the forward propulsion of the mower 20.

As the control lever 70 is moved forward and increases the range of operational speed of the mower 20, reference bar 68 is lowered relative to its neutral position. The lowered position of the reference bar 68 relative to handlebar 58 increases the angle of the inclination of the ends of the reference bar 68, causing a correlated increase in destroking of the hydraulic pumps 48, 50 and reduction in speed of the mower 20 when maneuvering the turn. In more simplified terms, the higher that the speed limiter control lever 70 is positioned, the greater the incline of the ends of the reference bar 68 and the greater the destroking of the driving pumps 48, 50 when maneuvering a turn. Hence, the magnitude and rate of speed reduction during a turn are, generally speaking, directly proportional to the speed of the mower 20. According, lawnmower 20 is not only simple and efficient to operate, but the training required of new operators to relatively simple. Accordingly, lawnmower 20 can be efficiently produced and is simple to operate.

Therefore, one embodiment of the invention includes a steering assembly for a mower that has first and second drives configured to move first and second drive wheels, respectively. The steering assembly includes a steering handle configured to steer the mower in a turn direction relative to a forward direction of travel. Movement of the steering handle in a vertical direction varies an output of the first and second drives thereby varying operation of the first and second drive wheels. An interlock is variably positioned relative to the steering handle such that a position of the interlock is associated with a position of a speed limiter control lever that is configured to control a maximum speed of the first and second drives.

Another embodiment of the invention includes a mower having a cutting deck that is supported by a frame and a first and a second drive. The first drive is configured to operate a first drive wheel and the second drive is configured to operate a second drive wheel that is located opposite the first drive wheel. A steering control assembly includes a steering handle that is operatively connected to the first and the second drives. Lateral movement of the steering handle steers the mower in a turn direction relative to a forward travel direction and movement in the steering handle in a vertical direction controls forward movement of the mower.

A method of steering a vehicle according to another embodiment of the invention includes moving a steering handle in a vertical direction to drive a vehicle one of a forward and rearward direction of travel and moving the steering handle in a lateral direction from a central longitudinal position to cause the vehicle to turn.

As indicated above, many changes and modifications may be made to the present invention without departing from the spirit thereof. The scope of some of these changes is discussed above. The scope of others is apparent from the appended claims.

What we claim is:

1. A steering assembly for a utility vehicle having a first drive configured to move a first drive wheel and a second drive configured to move a second drive wheel located opposite the first drive wheel, comprising:
   (A) a steering handle which is movable laterally relative to a frame of the vehicle to steer the vehicle in a turn direction and which is movable in a vertical direction to vary the speed of the vehicle; and
   (B) a speed limiter variably positioned relative to the steering handle and selectively engageable by the steering handle, wherein movement of the speed limiter varies a maximum vertical movement of the steering handle relating to the frame and limits a maximum speed of the vehicle.

2. The steering assembly of claim 1, wherein lateral movement of the steering handle along the speed limiter automatically slows a speed of one of the first drive and the second drive when the vehicle is maneuvering a turn.

3. The steering assembly of claim 2, wherein the distance between the speed limiter and the steering handle determines a destroke rate of one of the first drive and second drive during a turning operation.

4. The steering assembly of claim 1, further comprising a speed control lever assembly for adjusting a distance between the speed limiter and the steering handle.

5. The steering assembly of claim 1, further comprising a calibration body constructed to tune operation of the first drive and a second drive with respect to a position of the steering handle relative to the speed limiter.

6. The steering assembly of claim 1, wherein the speed limiter comprises a generally curvilinear body having a first end and a second end that are pivotally connected to generally opposite lateral sides of the vehicle.

7. The steering assembly of claim 1, wherein the utility vehicle is a lawnmower.

8. A vehicle, comprising:
   (A) a frame;
   (B) a first drive configured to operate a first drive wheel;
   (C) a second drive configured to operate a second drive wheel and located opposite the first drive wheel; and
   (D) a steering control assembly having a steering handle operatively connected to the first and second drives by a steering rod and a plurality of drive rods that extend at least a majority of distance between the steering handle and the first and second drives, wherein lateral movement of the steering handle relative to the frame rotates the drive rods about the steering rod and steers the vehicle in a turn direction, and wherein movement in the steering handle in a vertical direction translates the steering rod and each of the drive rods in a fore or aft direction relative to the frame and controls forward and rearward movement of the vehicle.

9. The vehicle of claim 8, further comprising a speed limiter control connected to the frame and constructed to define a range of vertical motion of the steering handle.

10. The vehicle of claim 9, wherein the speed limiter control comprises a reference bar configured to limit movement of the steering handle based on a position of the speed limiter control.

11. The vehicle of claim 10, wherein the reference bar moves away from the steering handle as the speed limiter control position is altered to increase operational speed of the mower.

12. The vehicle of claim 10, wherein a maximum distance between a side of the reference bar and a corresponding side of the steering handle reduces a destroke of one of the first and second drives and a resultant deceleration during a turn.

13. The vehicle of claim 12, wherein the destroke is proportional to the movement of the steering handle from a neutral position and the position of the speed limiter control.

14. The vehicle of claim 8, wherein the vehicle is a lawnmower.

15. A method of controlling movement of a utility vehicle, comprising the steps of:
   (A) moving a steering handle in a vertical direction to drive a vehicle in one of a forward and rearward direction of travel;
   (B) moving the steering handle in a lateral direction from a central position relative to a frame of the vehicle to cause the vehicle to turn; and
   (C) moving a reference bar to adjust a maximum range of motion of the steering handle and limit a maximum speed of travel of the vehicle.

16. The method of claim 15, wherein the vehicle moves in a direction generally opposite the lateral direction of the steering handle.

17. The method of claim 15, further comprising adjusting the position of a speed limiter to provide another maximum range of steering handle motion that is different than the first maximum range of motion.

18. The method of claim 15, wherein the maximum range of motion of the steering handle is adjusted by adjusting a position of the reference bar relative to an at-rest position of the steering handle.

19. The method of claim 15, wherein moving the steering handle in a lateral direction slows operation of a drive unit positioned on a side of the vehicle opposite the lateral direction.

20. The method of claim 19, wherein the drive unit is hydraulic based and is slowed by destroking the drive unit relative to the operation of a drive unit attached to an opposite side of the vehicle.

21. The method of claim 15, wherein the vehicle is at least one of a lawnmower, a utility cart, and a power buggy.

22. A lawnmower, comprising:
   (A) a frame having a cutter deck mounted thereon;
   (B) a first drive configured to operate a first drive wheel;
   (C) a second drive configured to operate a second drive wheel located opposite the first drive wheel;
   (D) a steering control assembly having a steering handle operatively connected to the first and second drives, wherein rotation of the steering handle about a generally vertical axis steers the vehicle in a turn direction, and wherein pivotal movement of the steering handle about a generally horizontal axis from a neutral position thereof increases forward movement of the vehicle; and (E) a speed limiter control including a reference bar that is connected to the frame and that interacts with the steering handle upon pivotal motion of the steering handle into the reference bar to define a maximum range of pivotal motion of the steering handle, the reference bar being movable relative to the frame and to the steering handle to increase or decrease the maximum range of pivotal motion of the steering handle and, thereby, increase or decrease a maximum operational speed of the mower.

23. The vehicle of claim 22, wherein the reference bar and steering handle are shaped such that, at any given position of the reference bar, when the steering handle is pivoted into contact with the reference bar and is rotated to increase a turning angle of the lawnmower, the handle pivots toward its neutral position to increase a destroke of one of the first and second drives and decelerate the lawnmower.

24. The vehicle of claim 23, wherein the destroke and resultant lawnmower deceleration are proportional to the rotational movement of the steering handle from a neutral position.

25. The vehicle of claim 24, wherein the destroke and resultant lawnmower deceleration increases with an increase in an at-rest spacing between the handle and the reference bar and a resultant increase in range of maximum pivotal motion of the steering handle.

* * * * *